(12) United States Patent
Uenaka et al.

(10) Patent No.: US 7,643,084 B2
(45) Date of Patent: Jan. 5, 2010

(54) LIGHTING CONTROL APPARATUS

(75) Inventors: Yukio Uenaka, Tokyo (JP); Shuzo Seo, Saitama (JP)

(73) Assignee: HOYA Corporation, Tokyo (JP)

( * ) Notice: Subject to any disclaimer, the term of this patent is extended or adjusted under 35 U.S.C. 154(b) by 832 days.

(21) Appl. No.: 11/016,906

(22) Filed: Dec. 21, 2004

(65) Prior Publication Data
US 2005/0134725 A1   Jun. 23, 2005

(30) Foreign Application Priority Data

Dec. 22, 2003 (JP) ............... P2003-424490
Dec. 22, 2003 (JP) ............... P2004-424494

(51) Int. Cl.
*H04N 5/222* (2006.01)

(52) U.S. Cl. ................................... 348/370

(58) Field of Classification Search ... 348/226.1–229.1, 348/370–372; 396/9, 11, 97, 276; 315/241 P
See application file for complete search history.

(56) References Cited

U.S. PATENT DOCUMENTS

| | | | | |
|---|---|---|---|---|
| 3,649,124 | A * | 3/1972 | Takaoka et al. | 356/5.04 |
| 3,823,339 | A * | 7/1974 | Borneman et al. | 315/69 |
| 4,272,806 | A * | 6/1981 | Metzger | 363/21.17 |
| 5,587,644 | A * | 12/1996 | Masaki | 396/205 |
| 5,877,851 | A * | 3/1999 | Stann et al. | 356/5.09 |
| 6,275,256 | B1 * | 8/2001 | Olczak et al. | 348/131 |
| 6,584,283 | B2 * | 6/2003 | Gabello et al. | 396/109 |
| 2002/0008694 | A1 | 1/2002 | Miyachi et al. | |

FOREIGN PATENT DOCUMENTS

| | | |
|---|---|---|
| JP | 10-186059 | 7/1998 |
| JP | 2002-72166 | 3/2002 |
| JP | 2003-101836 | 4/2003 |

OTHER PUBLICATIONS

M. Okamura, "Revised Operational Amplifier Circuit Design", CQ Publishing Co., Ltd., together with an English language translation of the same Aug. 10, 1973.

H. Tsunoda, "Operational Amplifier Circuit and Analysis through Experimentation", Tokyo Denki University Press, together with an English language translation of the same. Jul. 20, 1982.

U.S. Appl. No. 11/016,726 to Uenaka et al., which was filed on Dec. 21, 2004.

U.S. Appl. No. 11/016,974 to Uenaka, which was filed on Dec. 21, 2004.

* cited by examiner

*Primary Examiner*—Nhan T Tran
*Assistant Examiner*—Akshay Trehan
(74) *Attorney, Agent, or Firm*—Greenblum & Bernstein P.L.C.

(57) ABSTRACT

A lighting control apparatus of a photographing apparatus comprises a lighting device and a signal supplying processor. The lighting device illuminates a photographic subject by receiving one of a sine wave signal, and a half-wave rectification wave signal, a saw wave signal, and a triangle wave signal in the exposure time. The signal supplying processor supplies one of the sine wave signal, the half-rectification wave signal, the saw wave signal, and the triangle wave signal, to be received, to the lighting device, in the exposure time.

21 Claims, 16 Drawing Sheets

LIGHTING CONTROL APPARATUS

BACKGROUND OF THE INVENTION

1. Field of the Invention

The present invention relates to a lighting control apparatus for a photographing apparatus, and in particular to improvement of a signal wave which drives a lighting device.

2. Description of the Related Art

A lighting device which uses LEDs is proposed, in place of a lighting device which uses strobe radiation such as a xenon pipe which has been widely used with photographing apparatus, such as a camera. LEDs can be driven at a low voltage, and the circuit construction of the LED is simple.

However, the temperature of an LED goes up due to continuous radiation of the LED. The rise of the LED temperature causes a decrease in the quantity of light emitted by the LED. FIG. 1 shows the relation between the temperature rise and the quantity of light emitted by the LED, so that FIG. 1 shows that the quantity of light, in other words, brightness of the LED falls when the temperature of the LED rises.

Japanese unexamined patent publication (KOKAI) No. 2003-101836 discloses a lighting device for a photographing apparatus. The radiating of light from the LEDs is driven by rectangular wave signals (pulse signals), and a continuous shot operation can be carried out while the LEDs radiate light.

Because a turn-off period is provided in the pulse signal, the LED radiation caused by this pulse signal is not continuous, hence the temperature rise of the LED due to the heat that occurs with continuous radiation is reduced in comparison to the temperature produced by the LED radiation when the direct current signal is used to drive the LED.

FIG. 2 shows a graph where the horizontal axis represents time and the vertical axis represents temperature. The graph shows the difference in temperature rise of the LED due to the direct current signal ((1) in FIG. 2) and the temperature rise of the LED due to the pulse signal (the rectangular wave signal) ((2) in FIG. 2).

When the pulse signal and the direct current signal are in the on state, the LED for lighting is illuminated.

In the case of the direct current signal, because a constant current flows during the period for which the LED should be illuminated (T0~T5), the temperature of the LED continues to go up. When the direct current signal changes to the off state (T5), the temperature of the LED descends.

In the case of the pulse signal, the period for which the LED is not illuminated is the period which the signal is in the off state (T1~T2, T3~T4), so that the temperature of the LED descends in this period (T1~T2, T3~T4). Accordingly, during the illumination period of the LED, the temperature of the LED repeatedly rises and descends. As a result, the accumulation of heat is small in comparison with in the case where the direct current signal is used.

However, when the rectangular wave signals which are discussed in the above mentioned Japanese unexamined patent publication, are used, noise occurs in the power lines due to the rectangular wave signal switching between the on state and off state, noise occurs in the peripheral circuit due to the high-frequency component which is included in the rectangular wave signal, and a rush current results.

SUMMARY OF THE INVENTION

Therefore, an object of the present invention is to provide an apparatus which drives the lighting device by using a signal wave which has the high-frequency component removed in the rectangular wave signal, in order to reduce the influences of various kinds of noise.

According to the present invention, a lighting control apparatus of a photographing apparatus comprises a lighting device and a signal supplying processor.

The lighting device illuminates a photographic subject by receiving one of a sine wave signal, a half-wave rectification wave signal, a saw wave signal, and a triangle wave signal in the exposure time.

The signal supplying processor supplies one of the sine wave signal, the half-rectification wave signal, the saw wave signal, and the triangle wave signal, to be received, to the lighting device, in the exposure time.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
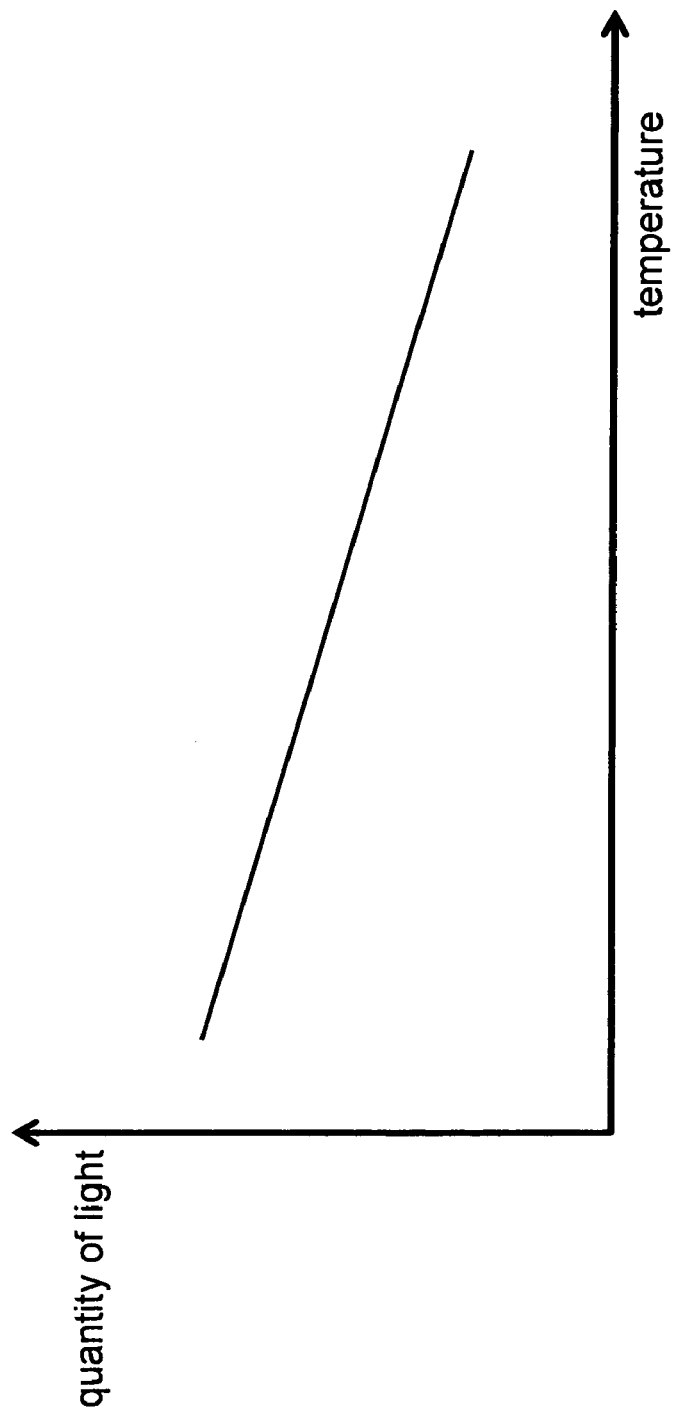
FIG. 1 shows a graph of the relationship between temperature of the LED and the quantity of light output by the LED.
Figure 2:
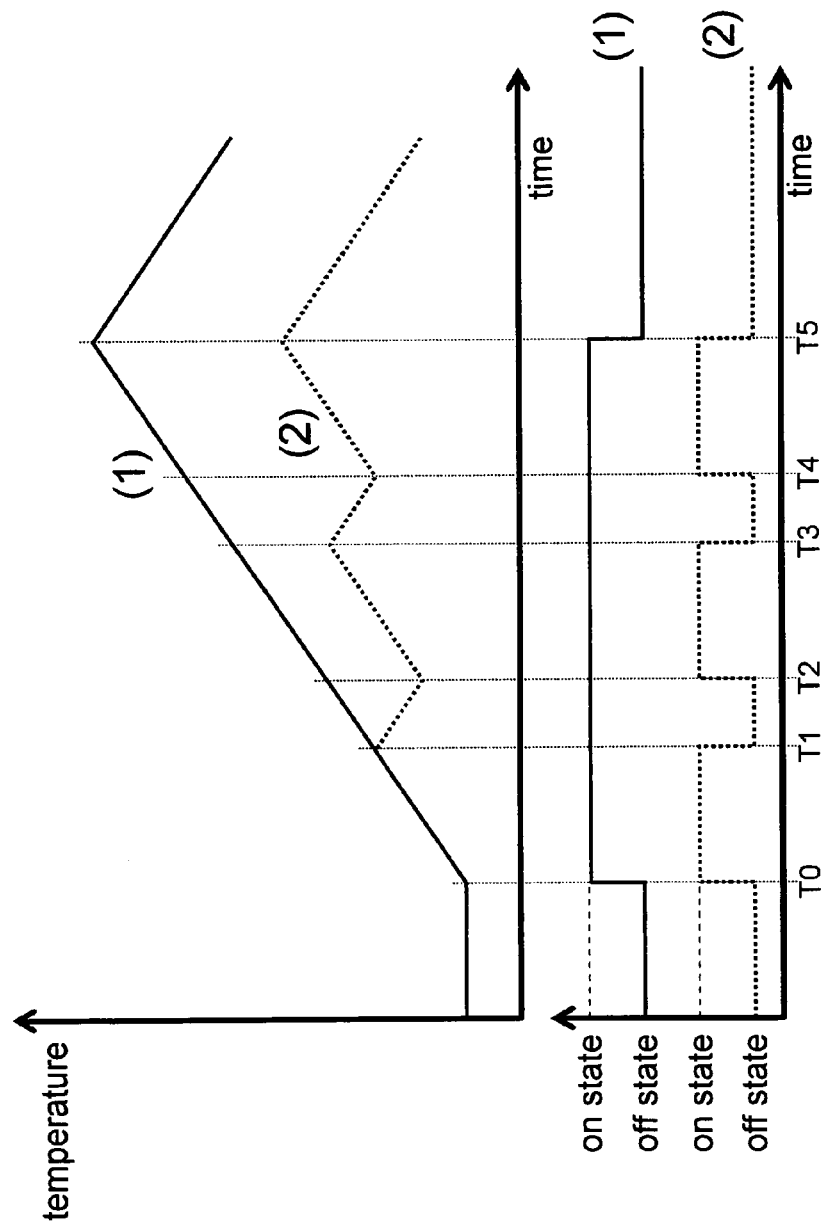
FIG. 2 shows a graph of the temperature change in the LED over time for the direct current signal and for the pulse signal.
Figure 3:
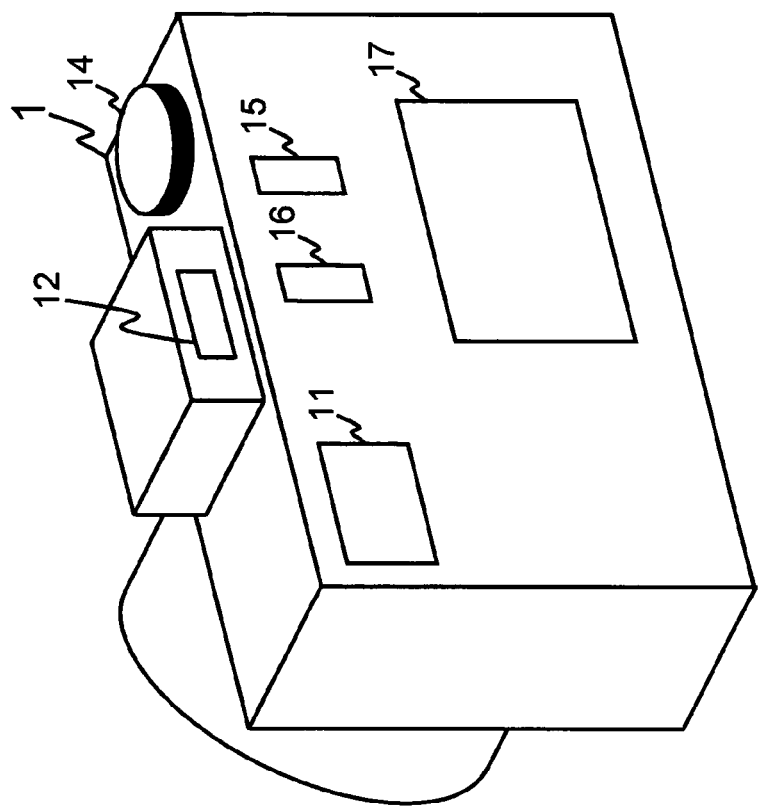
FIG. 3 is a perspective view of a photographing apparatus of the embodiments viewed from the back side of the photographing apparatus.
Figure 4:
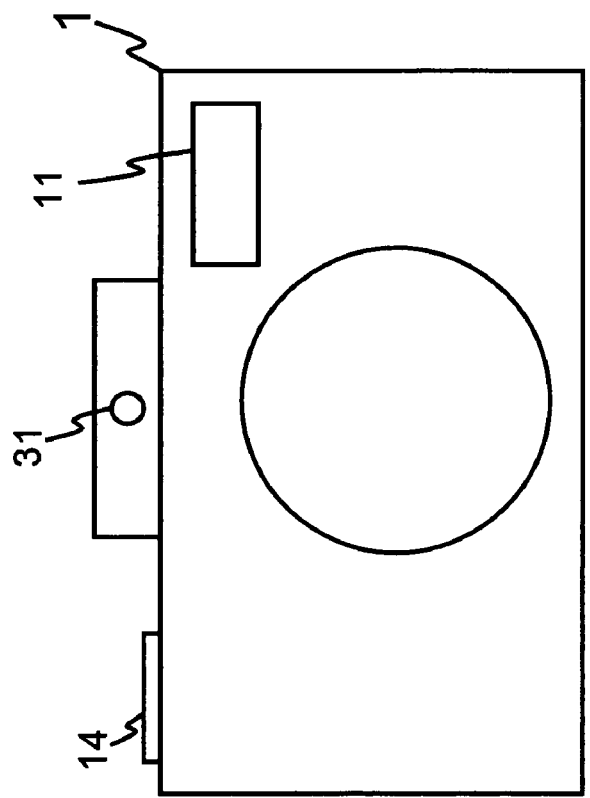
FIG. 4 is a front view of the photographing apparatus of the embodiments.
Figure 5:
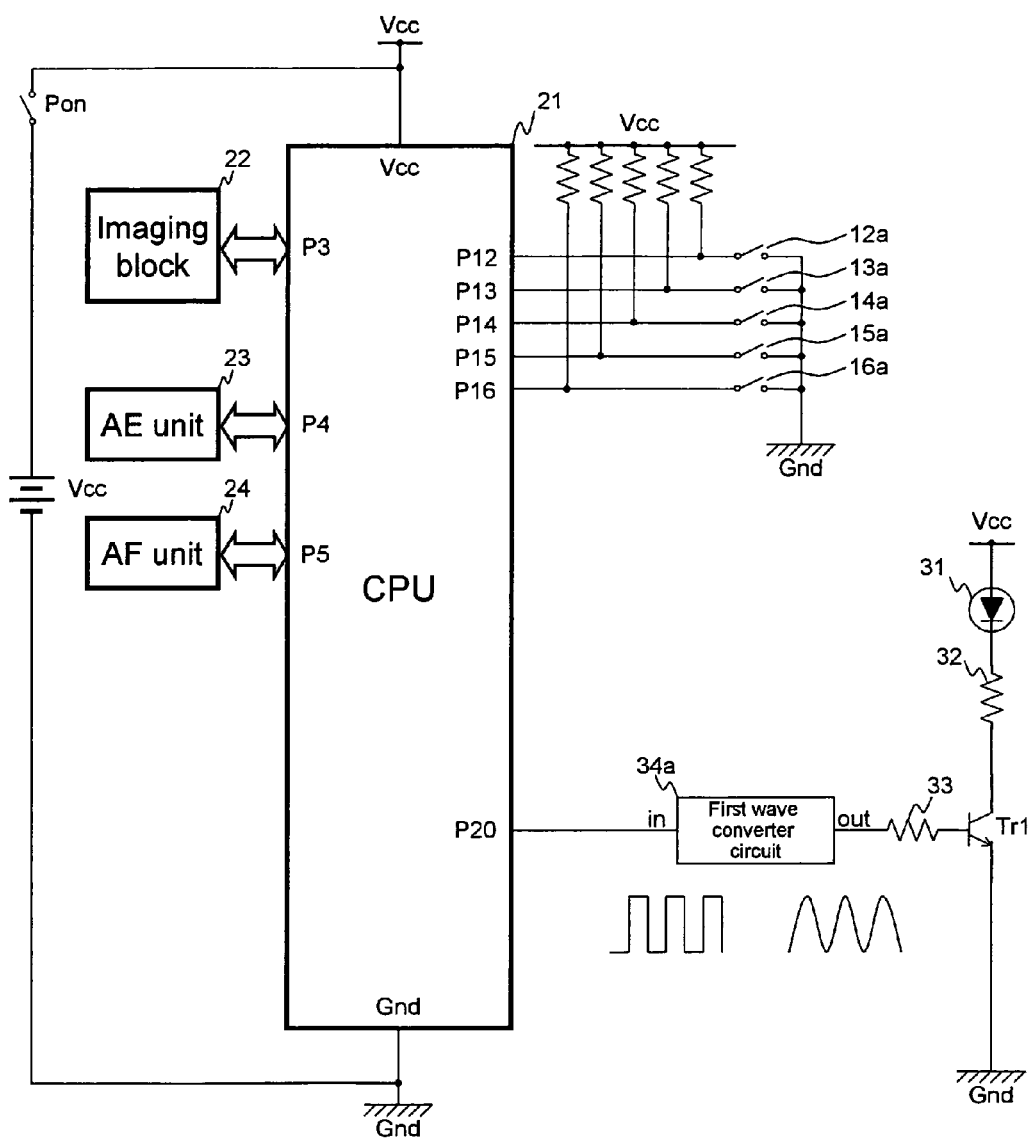
FIG. 5 is a circuit construction diagram of the photographing apparatus of the first embodiment.
Figure 6:
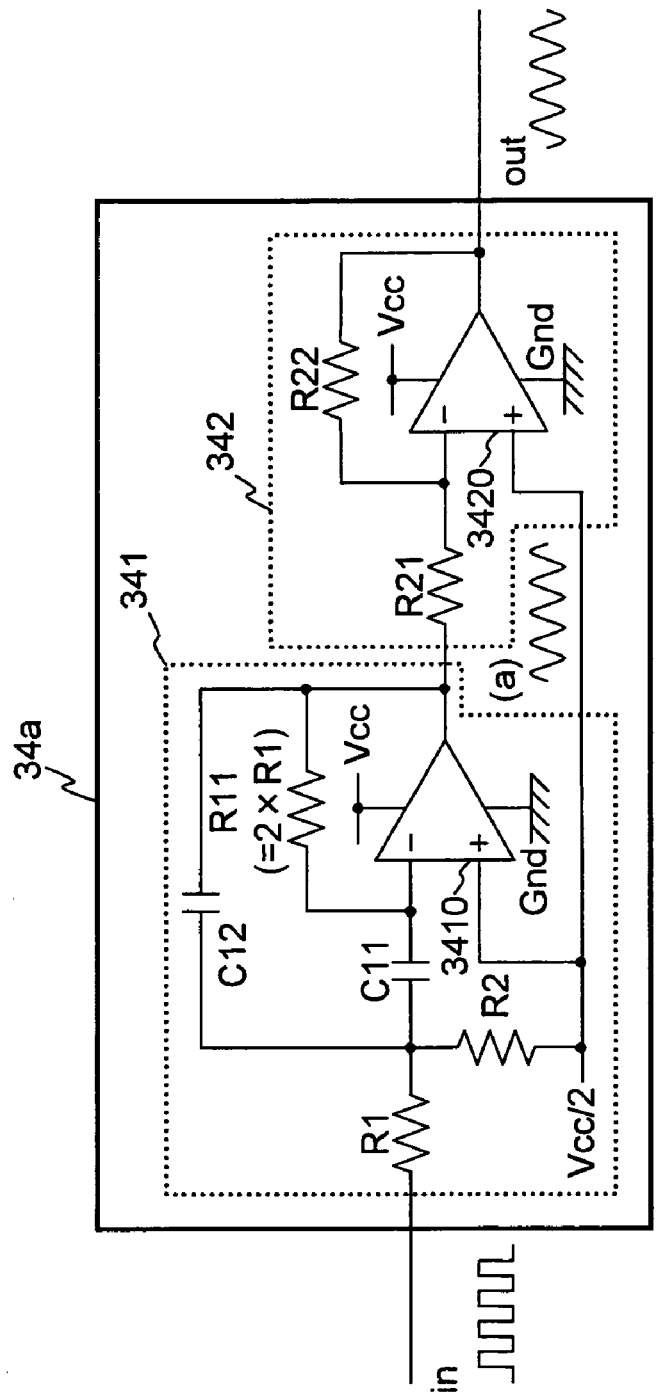
FIG. 6 is a circuit construction diagram of the first wave converter circuit of the first embodiment.

The present invention is described below with reference to the first, second, and third embodiments shown in the drawings. FIG. 3 shows a perspective view of a photographing apparatus 1 which comprises a lighting control unit, viewed from the back of the photographing apparatus 1, in these embodiments. FIG. 4 is a front view of the photographing apparatus 1, in these embodiments. In these embodiments, the photographing apparatus 1 is a digital camera.

In these embodiments, a pulse-amplitude and a pulse-cycle are used with reference to the rectangular wave signal and the inverted rectangular wave signal, and an amplitude and a cycle are used with reference to the other signals (the first and second sine wave signals, the half-wave rectification wave signal, the saw wave signal, and the triangle wave signal). Both the pulse-amplitude of the rectangular pulse wave and the inverted rectangular pulse wave, and the amplitude of the other waves, define the difference in the maximum and minimum values, in other words, the width of vibration.

The first embodiment is explained with reference to FIG. 1 to FIG. 9. The photographing apparatus 1 comprises an optical finder 11, an LED on button 12, an LED on switch 12a, a photometric switch 13a, a release button 14, a release switch 14a, a continuous shot button 15, a continuous shot switch 15a, a video button 16, a video switch 16a, an LCD monitor 17, an LED 31 for lighting, and a first wave converter circuit 34a.

The photographing apparatus 1 comprises a CPU 21, an imaging block 22, an AE (automatic exposure) unit 23, and an AF (automatic focusing) unit 24. The imaging block 22 is composed of an imaging device such as a CCD etc. (which is not depicted). The AE unit 23 performs the photometric operation for the photographic subject, calculates the photometric values, and calculates the aperture value and the time length of the exposure time which is needed for imaging, corresponding to the photometric values. The AF unit 24 performs the AF sensing operation, and performs the focusing operation which is needed for the imaging, corresponding to the result of the AF sensing operation.

The optical finder 11 is an apparatus which can be used to optically observe the photographic subject image. The photographic subject image can also be indicated on the LCD 17, as an image which is imaged by the imaging block 22.

When the LED on button 12 is pushed by the operator, the LED on switch 12a changes to the on state, so that the LED 31 is illuminated in the exposure time etc.

When the release button 14 is half pushed by the operator, the photometric switch 13a changes to the on state, so that the photometric operation, the AF sensing operation, and the focusing operation are performed.

When the release button 14 is fully pushed by the operator, the release switch 14a changes to the on state, so that the imaging operation is performed.

When the continuous shot button 15 is pushed by the operator, the continuous shot switch 15a changes to the on state, and a plurality of photographic subject images are continuously imaged, for example three frames per second, while the release switch 14a is in the on state. When the continuous shot switch 15a is in the on state, the photographing apparatus 1 is in a continuous shot mode.

When the video button 16 is pushed by the operator, the video switch 16a changes to the on state, so that the photographic subject image is imaged at a predetermined frame interval, and is stored as a moving picture, while the release switch 14a is in the on state. When the video switch 16a is in the on state, the photographing apparatus 1 is in a video mode.

The LED 31 is a lighting device such as an electric flash which supplies a proper quantity of light to the photographic subject, to illuminate the photographic subject, during an exposure time in accordance with the exposure timing, when there is insufficient lighting of the photographic subject.

The LED 31 is driven in accordance with a first sine wave signal which is supplied from the CPU 21 through the port P20 of the CPU 21 and the first wave converter circuit 34a (which is described later).

The CPU 21 outputs the rectangular wave signal to the first wave converter circuit 34a from the port 20. The first wave converter circuit 34a converts the rectangular wave signal to the first sine wave signal.

In the first embodiment, a duty ratio D is defined as the ratio of time in the on state (the pulse-width $\tau 1$), to the time of one pulse-cycle C1 of the rectangular wave signal.

The rectangular wave signal, having a pulse-amplitude of Vcc, a pulse-cycle of C1, and a duty ratio of D, is output from the CPU 21 during the exposure time in which an imaging operation is performed. The rectangular wave signal is not output between the exposure time termination and the next exposure time start, in other words the post-exposure time, or at any time other than that for the exposure operation. The rectangular wave signal is output with 0% duty ratio in the post-exposure time. The value of the duty ratio D is larger than 0%, and is smaller than 100%. The duty ratio D is set by using the PWM timer function of the CPU 21 in accordance with a proper quantity of light for illuminating the photographic subject.

The rectangular wave signal is a pulse signal of which the on state and off state are continuously switched according to a certain on/off cycle C1 (which is equal to the reciprocal of the value of the duty frequency f). In the first embodiment, the value of the duty frequency f is set in the CPU 21 in advance, however the value of the duty frequency f may be changed by the operator.

Accordingly, the CPU 21 has a rectangular wave signal generating function.

The first sine wave signal is composed of a first half sine wave and a second half wave which are connected.

The first half sine wave is a wave form corresponding to the on state of the rectangular wave (the section having the pulse-width $\tau 1$) and has the high-frequency component of the rectangular wave signal removed so that only the primary component remains.

The second half sine wave is a wave form corresponding to the off state of the rectangular wave (the section $\tau 2$ which is the difference between the pulse-cycle C1 and the pulse-width $\tau 1$). The high-frequency component is removed from the rectangular wave signal and only the primary component remains.

Accordingly, the first sine wave signal, comprising the first and second half sine waves, has an amplitude which is equal to the pulse-amplitude Vcc, and has a cycle which is equal to the pulse-cycle C1 (=$\tau 1+\tau 2$).

When the duty ratio D is 50%, the pulse-width $\tau 1$ and the section $\tau 2$, which is the difference between the pulse-cycle C1 and the pulse-width $\tau 1$, become the same, so that the first half sine wave and the second half sine wave are parts of the same sine wave. Or, the wave form of one cycle of the first sine wave signal has point symmetry, and has one sine wave form (see FIG. 7).

When the duty ratio D is not 50%, the pulse-width $\tau 1$ and the section $\tau 2$, which is the difference between the pulse-cycle C1 and the pulse-width $\tau 1$, are not the same, so that the first half sine wave and the second half sine wave are not parts of the same sine wave. Or, the wave form of one cycle of the first sine wave signal does not have point symmetry, and has a form where two sine waves are connected (see FIG. 8).

In the first embodiment, the wave signal, where the first half sine wave and the second half sine wave are connected, is defined as the first sine wave signal. Similarly, the wave signal which has the opposite phase to that of the first sine wave signal and of which the first half sine wave and the second half sine wave are connected, is defined as a second sine wave signal, as described later. It is desirable that the value of the duty frequency f is larger than or equal to 50 Hz, in other words the value of the on/off cycle (the pulse-cycle C1) should be smaller than or equal to 1/50 of a second, so that flickering does not occur in the LED 31, because the duty frequency of the first sine wave signal which is converted from the rectangular wave signal is equal to the duty frequency f.

The radiation level of the LED 31 is synchronized with the first sine wave signal, during illumination. Specifically, the radiation level of the LED 31 has a sine wave form which has the same cycle as the cycle C1 of the first sine wave signal, so that when the radiation level of the LED 31 has a maximum value, the first sine wave signal has a maximum value. However, the radiation level of the LED 31 is based on a characteristic of the LED 31 and a current amplification factor of the transistor Tr1.

In the first embodiment, whenever the LED on switch 12a is switched to the on sate by the operator, the LED 31 is automatically illuminated in the exposure time, however, the LED 31 may be automatically illuminated in the exposure time, according to the photometric value obtained from the photometric operation.

The various output commands corresponding to the input signals of these switches are controlled by the CPU 21.

The information whether the LED on switch 12a is in the on state or in the off state, is input to port P12 of the CPU 21 as a 1-bit digital signal. The information whether the photometric switch 13a is in the on state or in the off state, is input to port P13 of the CPU 21 as a 1-bit digital signal. The information whether the release switch 14a is in the on state or in the off state, is input to port P14 of the CPU 21 as a 1-bit digital signal. The information whether the continuous shot switch 15a is in the on state or in the off state, is input to port P15 of the CPU 21 as a 1-bit digital signal. The information whether the video switch 16a is in the on state or in the off state, is input to port P16 of the CPU 21 as a 1-bit digital signal.

The imaging block 22 is connected to port P3 of the CPU 21 for inputting and outputting signals. The AE unit 23 is connected to port P4 of the CPU 21 for inputting and outputting signals. The AF unit 24 is connected to port P5 of the CPU 21 for inputting and outputting signals.

The first wave converter circuit 34a, which supplies the first sine wave signal to the LED 31, is connected with the port 20 of the CPU 21. The CPU 21 outputs the rectangular wave signal with the duty ratio D to the first wave converter circuit 34a through the port 20.

The first wave converter circuit 34a is composed of an active filter circuit 341 and a first inverting amplifier 342.

Figure 7:
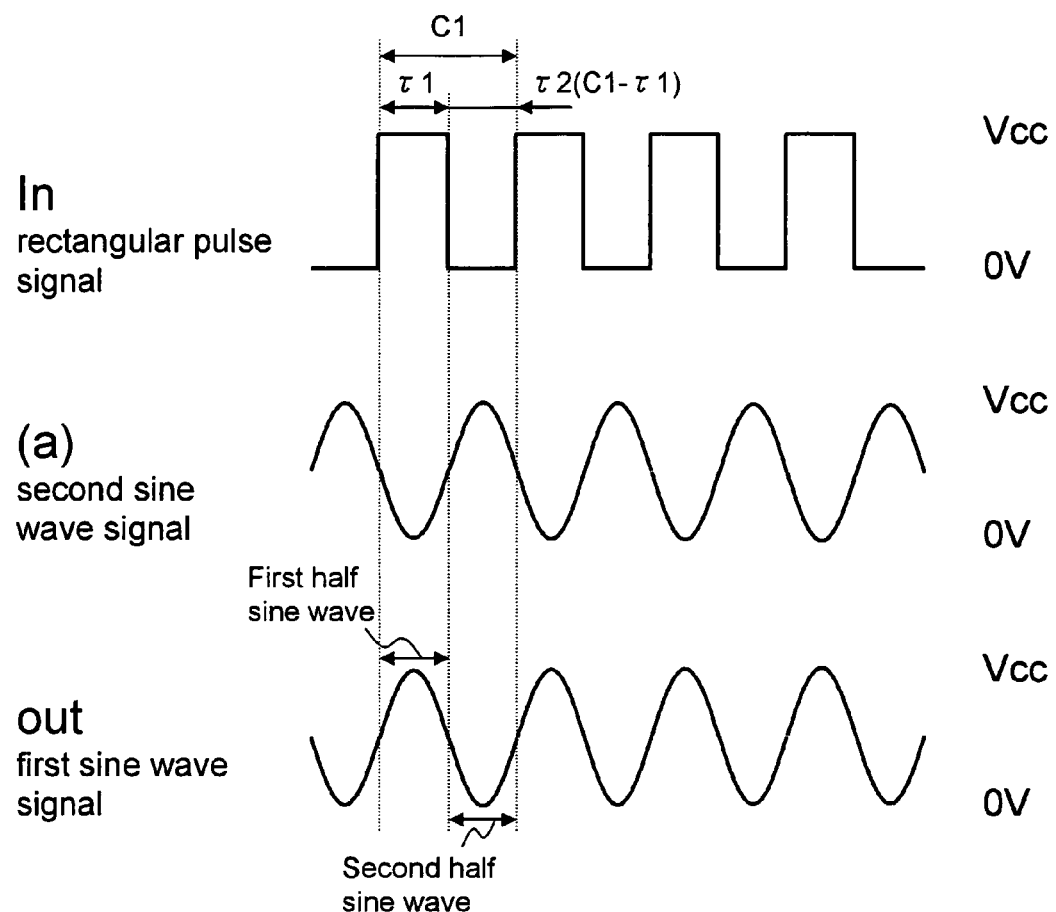
FIG. 7 shows the rectangular wave signal, the first sine wave signal, and the second sine wave signal, when the duty ratio of the rectangular wave signal is 50%.
Figure 8:
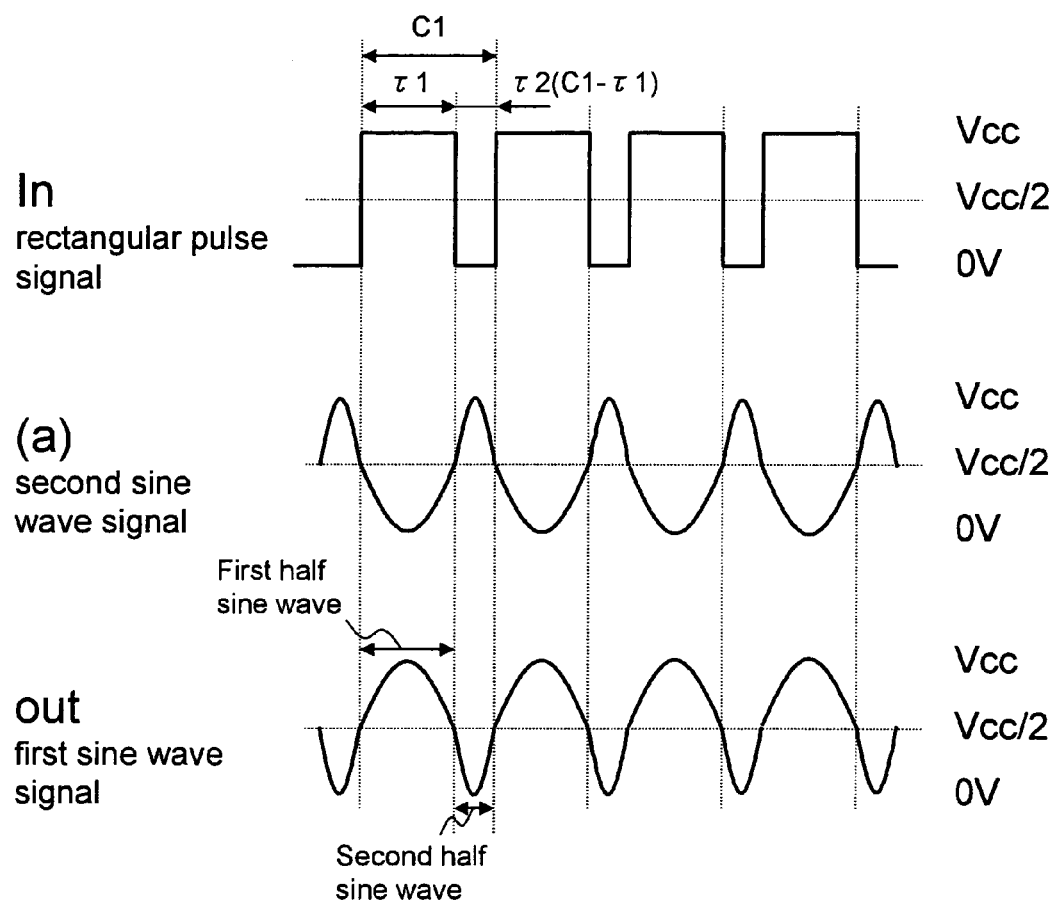
FIG. 8 shows the rectangular wave signal, the first sine wave signal, and the second sine wave signal, when the duty ratio of the rectangular wave signal is not 50%.

The active filter circuit 341 converts the rectangular wave signal, which has the pulse-amplitude Vcc and the pulse-cycle C1 (see the "in" wave form of FIGS. 7 and 8), to a second sine wave signal, which has the amplitude Vcc and the cycle C1 (see the "(a)" wave form of FIGS. 7 and 8). While the rectangular wave signal is in the on state, the second sine wave signal has the minimum value. While the rectangular wave signal is in the off state, the second sine wave signal has the maximum value.

The first inverting amplifier 342 converts the second sine wave signal to the first sine wave signal (see the "out" wave form of FIGS. 7 and 8). The amplitude and the cycle of the first sine wave signal are the same as those of the second sine wave signal, however the first sine wave signal and the second sine wave signal have the opposite phase.

The active filter circuit 341 has a resistor R1, a resistor R2, a resistor R11 which has two times the resistance of the resistor R1, a capacitor C11, a capacitor C12, and a first operational amplifier 3410. The first operational amplifier 3410 has an inverting input terminal, a non-inverting input terminal, and an output terminal. The first operational amplifier 3410 is supplied with power having voltage Vcc.

The inverting input terminal of the first operational amplifier 3410 has the rectangular wave signal input thereto. The rectangular wave signal is the input signal passing through the resistor R1 and the capacitor C11, from the port 20 of the CPU 21. The non-inverting input terminal of the first operational amplifier 3410 is connected with the power supply whose voltage is ½ Vcc, and is connected with the non-inverting input terminal of the second operational amplifier 3420 in the first inverting amplifier 342 which is described later. The second sine wave signal is output from the output terminal of the first operational amplifier 3410. The output terminal of the first operational amplifier 3410 is connected with the inverting input terminal of the first operational amplifier 3410 through the resistor R11, and is connected with a point between the resistor R1 and the capacitor C11, through the capacitor C12. One terminal of the resistor R2 is connected with the non-inverting input terminal of the first operational amplifier 3410 and the power supply whose voltage is ½ Vcc, so that the other terminal of the resistor R2 is connected with a point between the resistor R1 and the capacitor C11. The output terminal of the first operational amplifier 3410 is connected with the inverting input terminal of the second operational amplifier 3420, through the resistor R21 in the first inverting amplifier 342 which is described later.

The first inverting amplifier 342 has a resistor R21, a resistor R22, and a second operational amplifier 3420. The second operational amplifier 3420 has an inverting input terminal, a non-inverting input terminal, and an output terminal. The second operational amplifier 3420 is supplied with power having a voltage Vcc.

The inverting input terminal of the second operational amplifier 3420 has the second sine wave signal input thereto. The second sine wave signal is input, through the resistor R21, from the output terminal of the first operational amplifier 3410. The non-inverting input terminal of the second operational amplifier 3420 is connected with the non-inverting input terminal of the first operational amplifier 3410 in the active filter circuit 341. The first sine wave signal is output from the output terminal of the second operational amplifier 3420. The output terminal of the second operational amplifier 3420 is connected with the inverting input terminal of the second operational amplifier 3420 through the resistor R22.

The photographing apparatus 1 comprises an illuminating circuit which illuminates the LED 31, and which has a current limiting resistor 33, a transistor Tr1, and a limiting resistor 32. The first sine wave signal is supplied to the LED 31 through the illuminating circuit. The transistor Tr1 is an NPN transistor for amplifying the first sine wave signal which is supplied to the LED 31, and whose base is connected to the CPU 21 through the current limiting resistor 33 and the first wave converter circuit 34a. The emitter of the transistor Tr1 is grounded, the collector of the transistor Tr1 is connected with the cathode of the LED 31 through the limiting resistor 32. The anode of the LED 31 is connected with the power supply whose voltage is Vcc.

Accordingly, the CPU 21, the first wave converter circuit 34a, the current limiting resistor 33, the transistor Tr1, and the limiting resistor 32 have a signal supplying function which supplies the sine wave signal to the LED 31.

While the rectangular wave signal which is output from the CPU 21 is in the on state, the first sine wave signal has the maximum value. While the rectangular wave signal is in the off state, the first sine wave signal has the minimum value. Accordingly, the timing while the rectangular wave signal is in the on state and the timing when the first sine wave signal has the maximum value agree. Specifically, the first sine wave signal has the maximum value at a point that corresponds to the intermediate point of the section of the rectangular wave signal that is in the on state, so that the first sine wave signal has the minimum value at a point that corresponds to the intermediate point of the section of the rectangular wave signal that is in the off state.

In the first embodiment, it is explained that the first wave converter circuit 34a has the active filter circuit 341 and the first inverting amplifier 342, so that the first wave converter circuit 34a supplies the first sine wave signal to the LED 31, through the current limiting resistor 33 etc. However, the first wave converter circuit 34a may have only the active filter circuit 341, so that the first wave converter circuit 34a may supply the second sine wave signal to the LED 31, through the current limiting resistor 33 etc. In this case, while the rectangular wave signal which is output from the CPU 21 is in the on state, the second sine wave signal has the minimum value. While the rectangular wave signal is in the off state, the second sine wave signal has the maximum value. Accordingly, the timing while the rectangular wave signal is in the on state and the timing when the second sine wave signal has the maximum value do not agree. Specifically, the second sine wave signal has the minimum value at a point that corresponds to the intermediate point of the section of the rectangular wave signal that is in the on state, so that the second sine wave signal has the maximum value at a point that corresponds to the intermediate point of the section of the rectangular wave signal that is in the off state.

When the release button 14 is half pushed, the photometric switch 13a is set in the on state, so that the port P13 receives the on state signal. The CPU 21 drives an AE sensor (which is not depicted) of the AE unit 23, so that the AE unit 23 performs the photometric operation, calculates the photometric value, and then calculates the aperture value and the exposure time, which are needed for imaging, corresponding to the photometric values. The CPU 21 drives a sensor (which is not depicted) of the AF unit 24, so that the AF unit 24 performs the AF sensing operation. Further, a lens control circuit of the AF unit 24 (which is not depicted) is driven, and the focusing operation which is needed for imaging, is performed by moving the lens position in the light axis direction, corresponding to the result of the AF sensing operation.

When the release button 14 is fully pushed, the release switch 14a is set in the on state, so that the port 14 receives the on state signal. The CPU 21 performs the imaging operation, or the CPU 21 drives an aperture mechanism (which is not depicted) corresponding to the aperture value, drives a release of the shutter mechanism (which is not depicted) with a predetermined shutter speed, and then drives the imaging block 22 for the exposure.

When the LED on switch 12a and the release switch 14a are set in the on state, on state signals are input to the ports P12 and P14 (so that the CPU 21 outputs the rectangular wave signal in accordance with the exposure timing of the imaging block 22), the first wave converter circuit 34a converts the rectangular wave signal to the first sine wave signal, the first sine wave signal is supplied to the LED 31 through the current limiting resistor 33 etc., and the LED 31 illuminates on the basis of the first sine wave signal.

When the release switch 14a and the continuous shot switch 15a are set in the on state, on state signals are input to the ports P14 and P15. The imaging operation, controlled by the CPU 21, is continuously performed at a certain interval, while the release switch 14a is in the on state. In other words, the release of the shutter mechanism is driven, the imaging block 22 is driven, and the exposure operation is performed. The certain interval is set in the photographing apparatus 1 by the operator, in order to take continuous still images, for example ⅓ second. Accordingly, the CPU 21 has a continuous shot control function which continuously performs a plurality of exposure operations of the photographic subject.

When the release switch 14a and the video switch 16a are set in the on state, on state signals are input to the ports P14 and P16. The imaging operation, controlled by the CPU 21, is continuously performed at a predetermined interval, while the release switch 14a is in the on state. In other words, the release of the shutter mechanism is driven, the imaging block 22 is driven, and the exposure operation is performed. The predetermined interval is set in the photographing apparatus 1 in advance, in order to take a video image, for example 1/60 second (which is equal to one frame period).

When the LED on switch 12a, the release switch 14a, and the continuous shot switch 15a are set in the on state, the rectangular wave signal is output from the CPU 21, during the exposure time.

When the LED on switch 12a, the release switch 14a, and the video switch 16a are set in the on state, the rectangular wave signal is output from the CPU 21, during the exposure time.

The first sine wave signal is the rectangular wave signal which has the high-frequency component removed and for which only the primary component remains. Accordingly, when the LED 31 is illuminated on the basis of the first sine wave signal, it is possible to reduce the influence of noise in the power line, and noise to be transmitted to the peripheral circuit, that is caused by the high-frequency component which is included in the rectangular wave signal, in comparison with when the LED 31 is illuminated on the basis of the rectangular wave signal.

Because the increase/decrease of the radiation level is continuously repeated due to the first sine wave signal, in the exposure time, the temperature rise of the LED 31 is restrained, similar to the case where the LED 31 is driven by the rectangular wave signal. Further, because the amplitude Vcc of the first sine wave signal is non variable, there are also the merits of stabilizing the radiation quantity of the LED 31, to supply the predetermined light quantity, and of simplifying the circuit, in comparison with when the amplitude modulated sine wave signal is supplied to the LED 31 in the exposure time.

Figure 9:
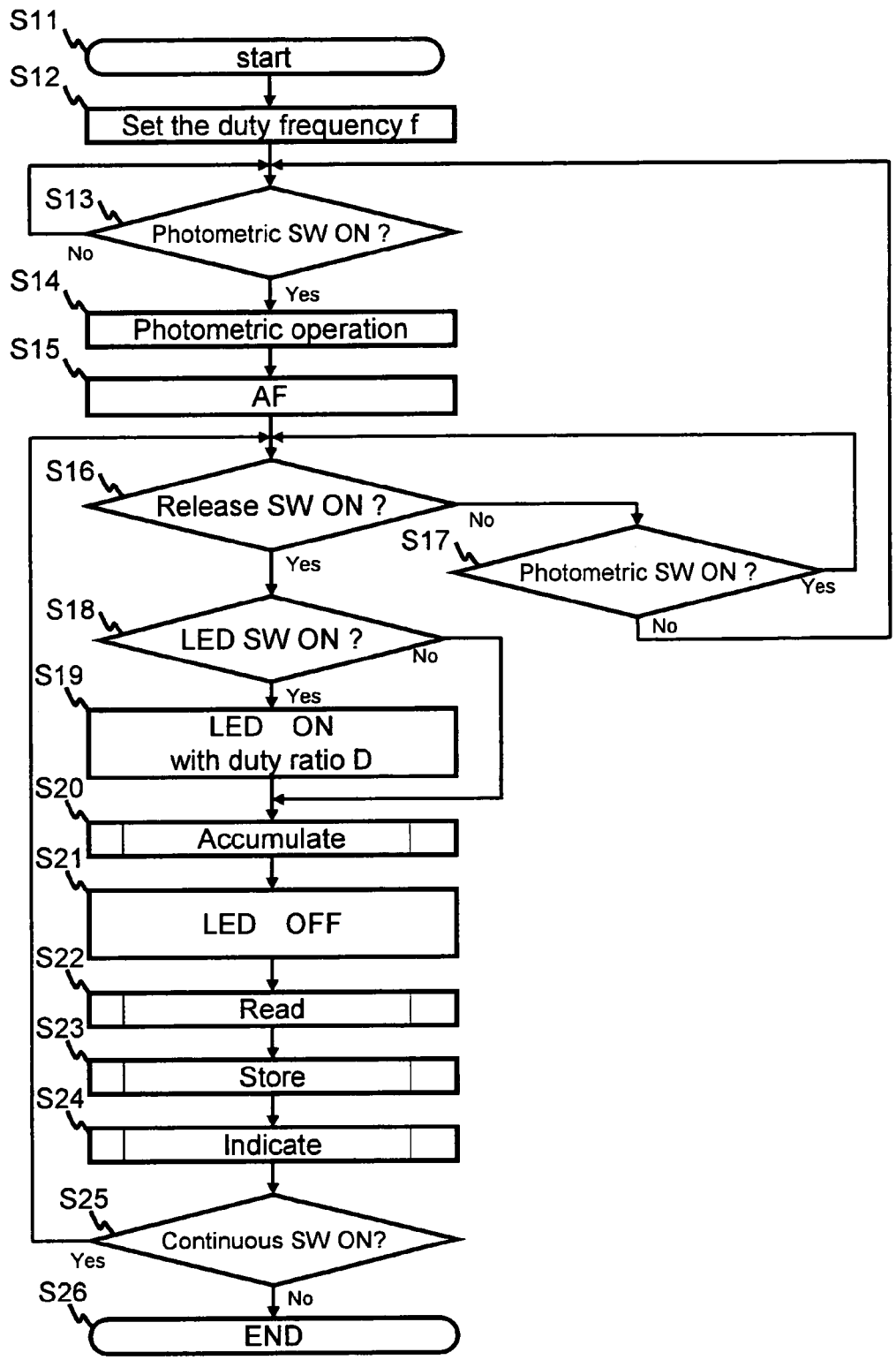
FIG. 9 is a flowchart of the LED illumination process in the exposure time.

Next, the control of the LED 31 in the exposure time, in the continuous shot mode (where the continuous shot switch 15a is in the on state), is explained by using the flowchart in FIG. 9.

In step S11, the power supply of the photographing apparatus 1 is set in the on state. In step S12, the duty frequency f is set in the CPU 21. However, the value of the duty frequency f may be set in the CPU 21 in advance.

In step S13, it is judged whether the photometric switch 13a is set in the on state. When it is judged that the photometric switch 13a is not set in the on state, the process in step S13 is repeatedly carried out. When it is judged that the photometric switch 13a is set in the on state, the AE sensor of the AE unit 23 is driven, the photometric operation is performed, and the aperture value and the exposure time are calculated in step S14. In step S15, the AF sensor of the AF unit 24 is driven, the AF sensing is performed, and the focusing operation is performed, by driving the lens control circuit of the AF unit 24.

In step S16, it is judged whether the release switch 14a is set in the on state. When it is judged that the release switch 14a is not in the on state, it is judged whether the photometric switch 13a is set in the on state, in step S17. When it is judged that the photometric switch 13a is set in the on state in step S17, the flow is returned to step S16. When it is judged that the photometric switch 13a is not set in the on state in step S17, the flow is returned to step S13. When it is judged that the release switch 14a is set in the on state in step S16, it is judged whether the LED on switch 12a is set in the on state, in step S18.

When it is judged that the LED on switch 12a is not in the on state in step S18, the LED 31 is not driven in the exposure time in accordance with the on state of the release switch 14a (in step S16), so that the exposure operation, in other words electric charge accumulation of the CCD, is performed under the condition where the LED 31 is not illuminated, in step S20. When it is judged that the LED on switch 12a is in the on state, the rectangular wave signal with the duty ratio D (0% <D <100%) which is set in advance, is output from the CPU 21 in the exposure time in accordance with the on state of the release switch 14a (in step S16), in step S19. The rectangular wave signal is converted to the first sine wave signal by the first wave converter circuit 34a, so that the first sine wave signal is supplied to the LED 31 through the current limiting resistor 33 etc. The exposure operation, in other words electric charge accumulation of the CCD, is performed under the condition where the LED 31 is illuminated, in step S20.

After the exposure time has passed, the LED 31 is turned off, in step S21. Or, the duty ratio D of the rectangular wave signal which is output by the CPU 21, becomes 0%. In step S22, the electric charge which is accumulated in the CCD in the exposure time, is read, so that, in step S23, the electric charge which is read, is stored in the memory of the photographing apparatus 1, as the image signal which was imaged by the imaging block 22. In step S24, the image signal which is stored, is indicated on the LCD monitor 17.

In step S25, it is judged whether the continuous shot switch 15a is in the on state. When it is judged that the continuous shot switch 15a is in the on state, the flow is returned to step S16, so that the next exposure operation is performed. When it is judged that the continuous shot switch 15a is not in the on state, in step S26, the control of the LED 31 in the exposure time, in the continuous shot mode (where the continuous shot switch 15a is in the on state), is finished.

Similarly, the control of the LED 31 in the exposure time, in the video mode (where the video switch 16a is in the on state), can be explained by using FIG. 9.

Figure 10:
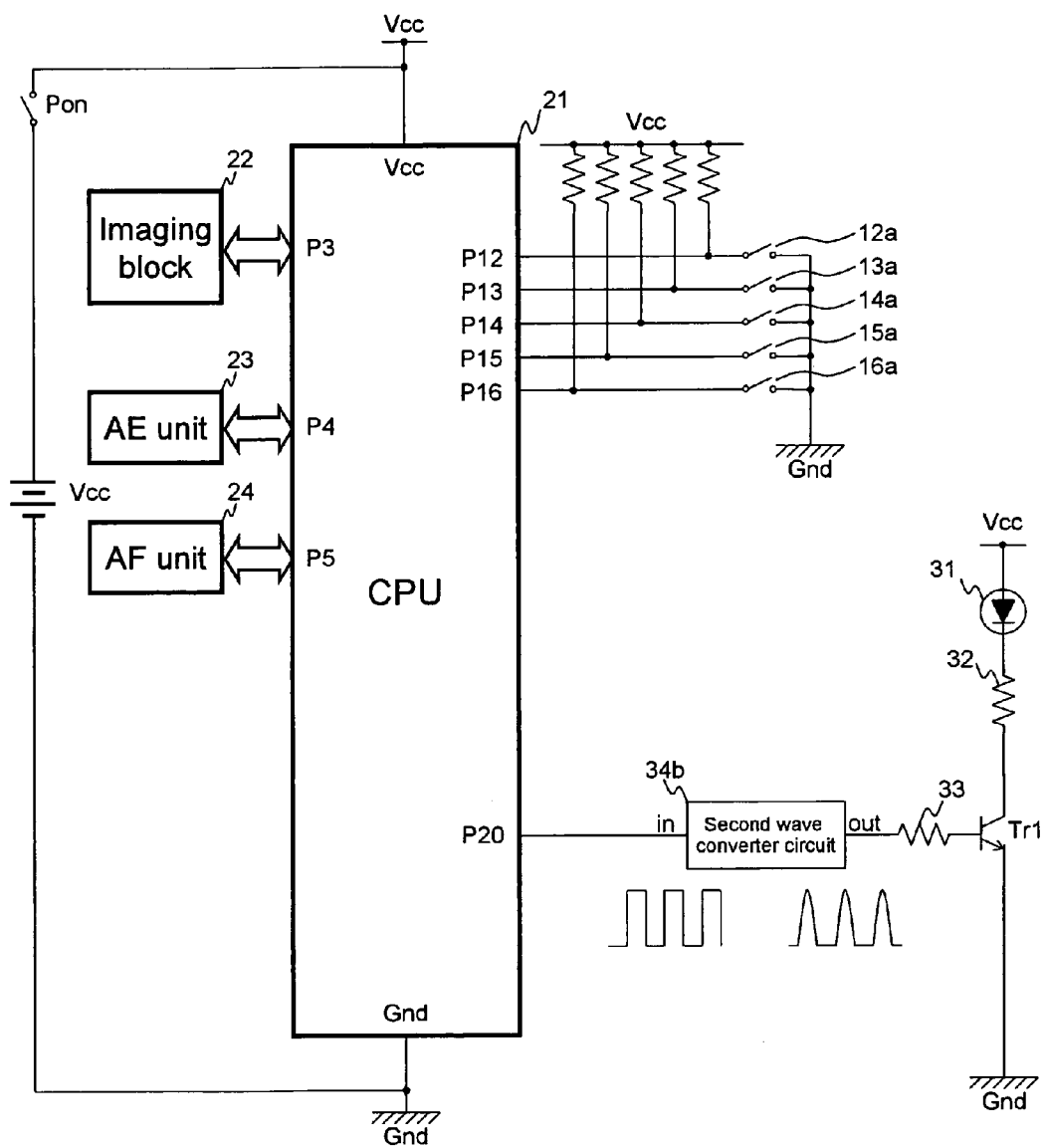
FIG. 10 is a circuit construction diagram of the photographing apparatus of the second embodiment.
Figure 11:
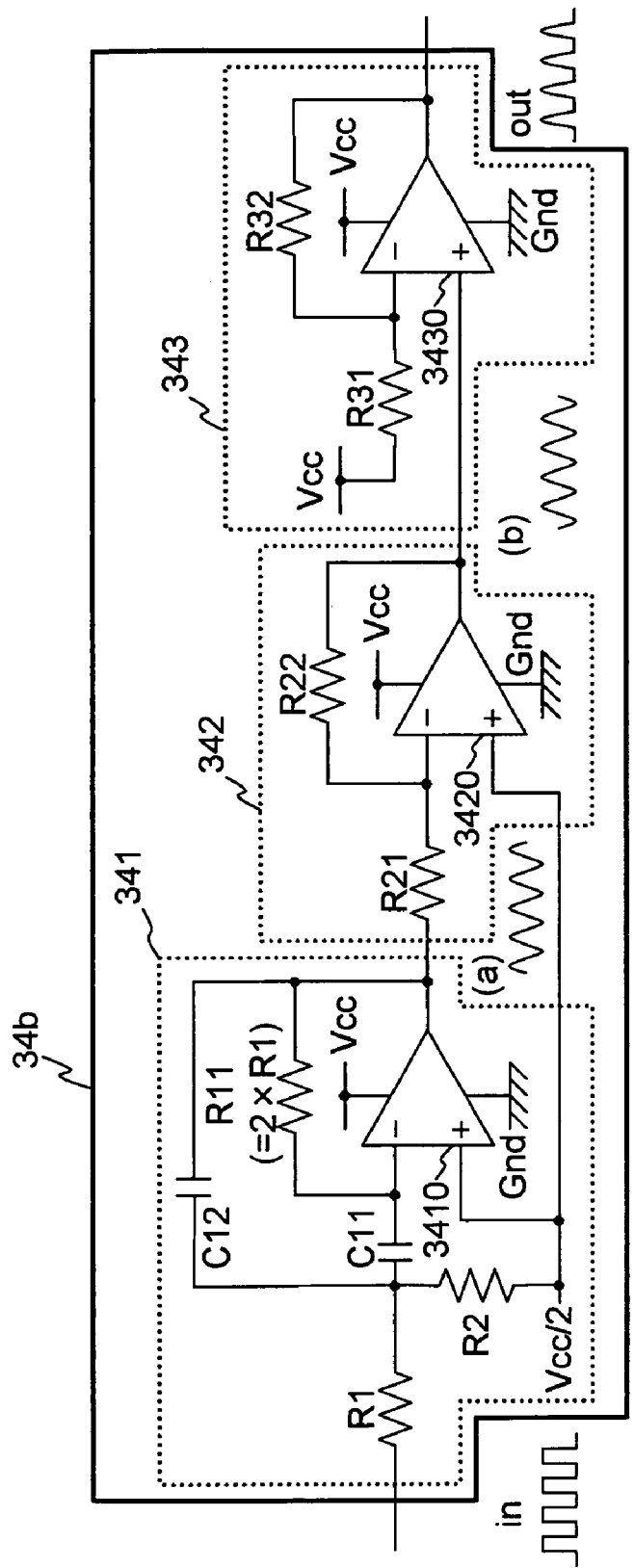
FIG. 11 is a circuit construction diagram of the second wave converter circuit of the second embodiment.

Next, the second embodiment is explained with reference to FIG. 1 to FIG. 4 and FIG. 10 to FIG. 13. In the second embodiment, the half-wave rectification wave signal which is converted from the first sine wave signal, is supplied to the LED 31 through the current limiting resistor 33 etc. FIG. 10 is a circuit construction diagram of the photographing apparatus 1, in which the second wave converter circuit 34b has replaced the first wave converter circuit 34a.

The half-wave rectification wave signal is composed of a third half sine wave and an off-state signal which are connected.

The third half sine wave is a wave which has the high-frequency component removed and only the primary component remains, from the rectangular wave signal, and whose amplitude is two times that of the first half sine wave, corresponding to the on state of the rectangular wave (the section of the pulse-width $\tau 1$). The off-state signal is an off-state wave corresponding to the off state of the rectangular wave (the section $\tau 2$ which is the difference between the pulse-cycle C1 and the pulse-width $\tau 1$).

The third half sine wave has the half cycle section of the first half part of the sine wave with an amplitude Vcc×2, and a cycle 2×$\tau 1$.

Figure 12:
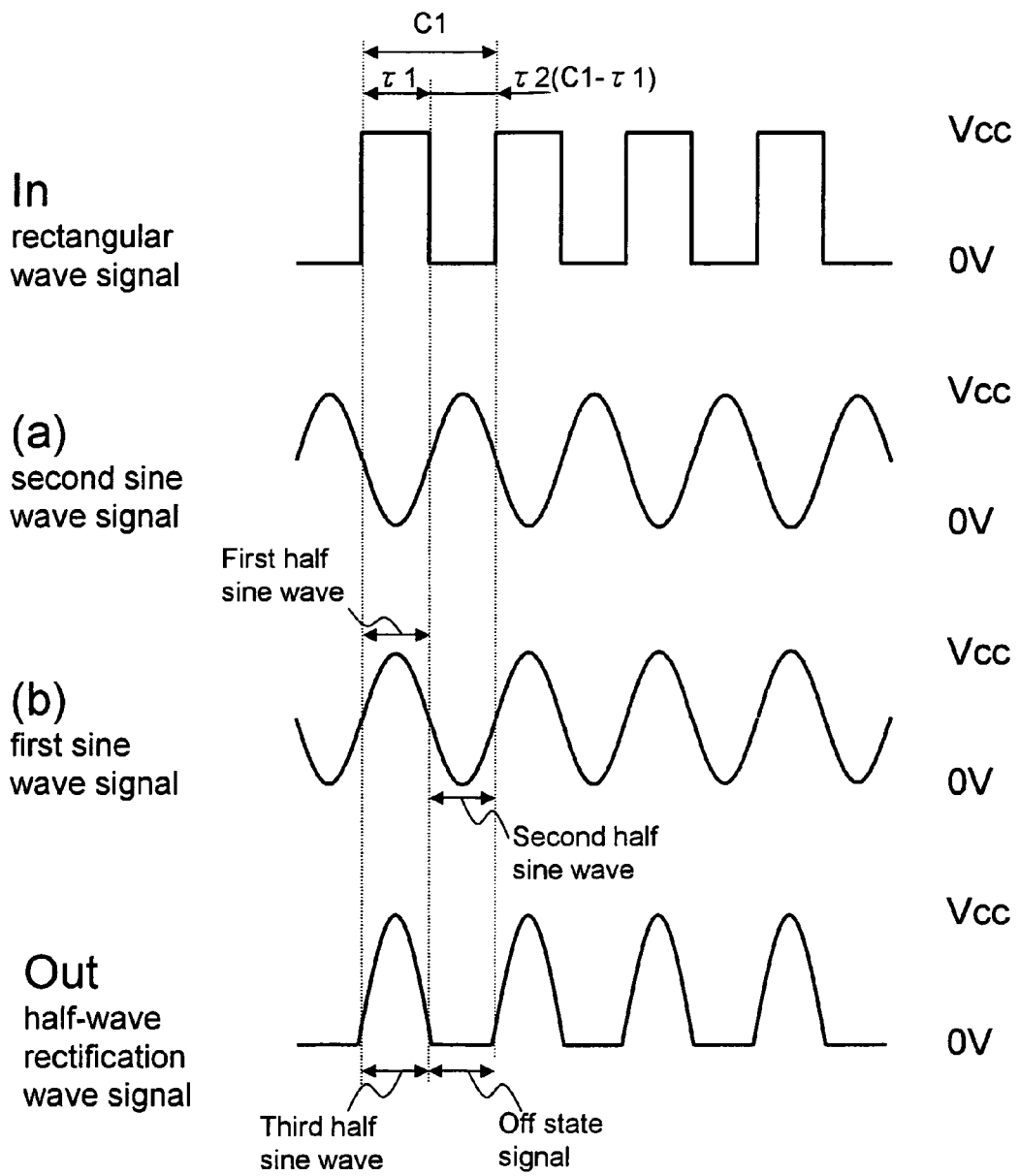
FIG. 12 shows the rectangular wave signal, the first sine wave signal, the second sine wave signal, and the half-wave rectification wave signal, when the duty ratio of the rectangular wave signal is 50%.
Figure 13:
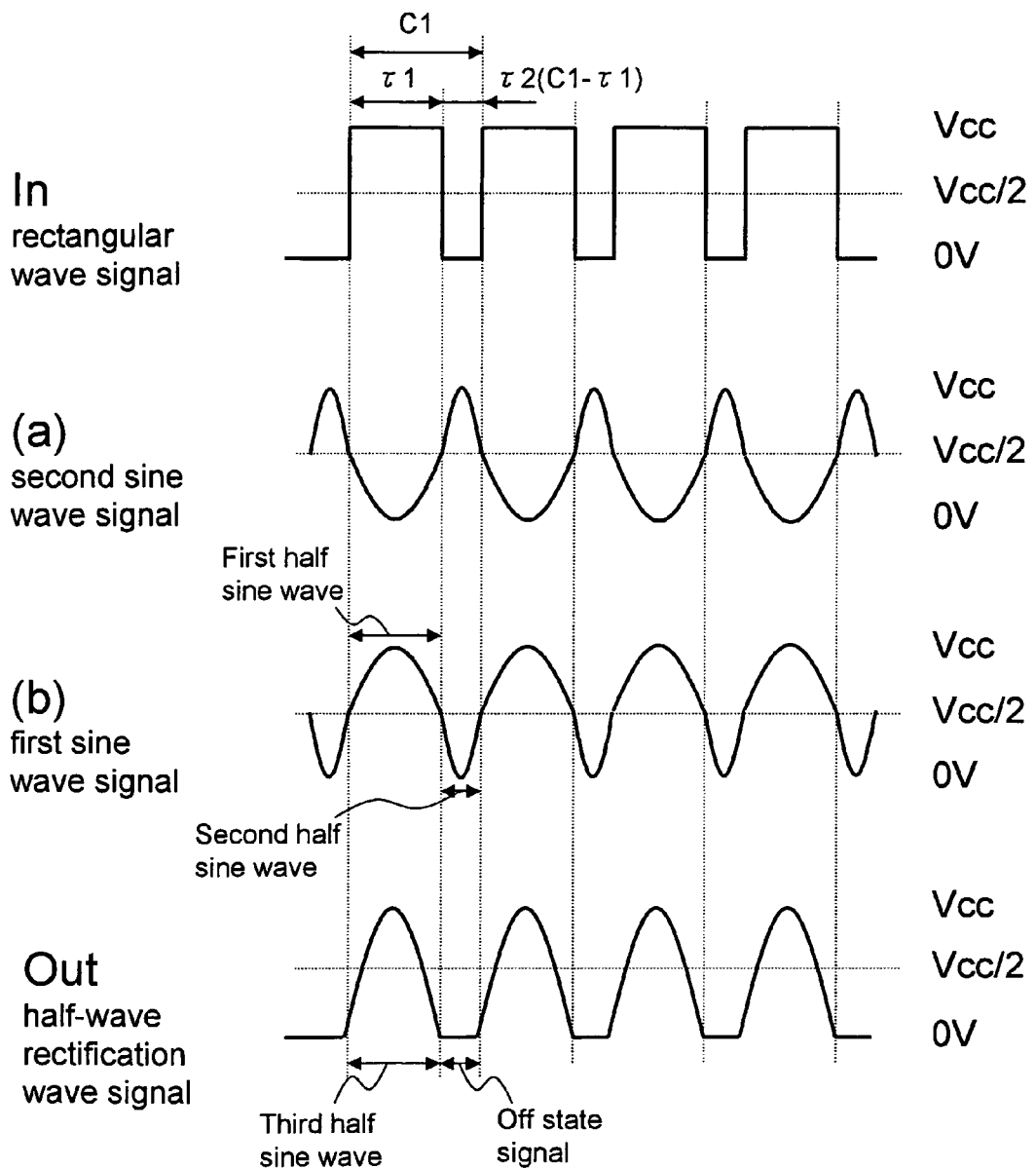
FIG. 13 shows the rectangular wave signal, the first sine wave signal, the second sine wave signal, and the half-wave rectification wave signal, when the duty ratio of the rectangular wave signal is not 50%.

Accordingly, the half-wave rectification wave signal, comprising the third half sine wave and the off-state signal, has an amplitude which is equal to the pulse-amplitude Vcc, and has a cycle which is equal to the pulse-cycle C1 ($=\tau 1+\tau 2$) (see FIGS. 12 and 13).

The radiation level of the LED 31 is synchronized with the half-wave rectification wave signal, during illumination. Specifically, the radiation level of the LED 31 has a half-wave rectification wave form which has the same cycle as the cycle C1 of the half-wave rectification wave signal, so that when the radiation level of the LED 31 has a maximum value, the half-wave rectification wave signal has a maximum value. However, the radiation level of the LED 31 is based on a characteristic of the LED 31 and a current amplification factor of the transistor Tr1.

The photographing apparatus 1 comprises a second wave converter circuit 34b instead of the first wave converter circuit 34a, in the second embodiment. The second wave converter circuit 34b has a half-wave rectification circuit 343 in addition to the active filter circuit 341 and the first inverting amplifier 342.

The active filter circuit 341 converts the rectangular wave signal, which has the pulse-amplitude Vcc and the pulse-cycle C1 (see the "in" wave form of FIGS. 12 and 13), to a second sine wave signal, which has the amplitude Vcc and the cycle C1 (see the "(a)" wave form of FIGS. 12 and 13). While the rectangular wave signal is in the on state, the second sine wave signal has the minimum value. While the rectangular wave signal is in the off state, the second sine wave signal has the maximum value.

The first inverting amplifier 342 converts the second sine wave signal to the first sine wave signal (see the "(b)" wave form of FIGS. 12 and 13). The amplitude and the cycle of the first sine wave signal are the same as those of the second sine wave signal, however, the first sine wave signal and the second sine wave signal have the opposite phase.

The half-wave rectification circuit 343 converts the first sine wave signal to the half-wave rectification wave signal, which has the amplitude Vcc, and the cycle C1 (see the "out" wave form of FIGS. 12 and 13). While the rectangular wave signal is in the on state, the half-wave rectification wave signal has the maximum value. While the rectangular wave signal is in the off state, the half-wave rectification wave signal is in the off state (the minimum value).

Accordingly, the CPU 21, the second wave converter circuit 34b, the current limiting resistor 33, the transistor Tr1, and the limiting resistor 32 have a signal supplying function which supplies the half-wave rectification wave signal to the LED 31.

The construction of the active filter circuit 341 in the second embodiment is the same as the construction of the active filter circuit 341 in the first embodiment.

The construction of the first inverting amplifier 342 in the second embodiment is the same as the construction of the first inverting amplifier 342 in the first embodiment. However, the output terminal of the second operational amplifier 3420 in the first inverting amplifier 342 is connected with the non-inverting input terminal of the third operational amplifier 3430 which is described later, in the second embodiment.

The half-wave rectification circuit 343 has a resistor R31, a resistor R32, and a third operational amplifier 3430. The third operational amplifier 3430 has an inverting input terminal, a non-inverting input terminal, and an output terminal. The third operational amplifier 3430 is supplied with power having voltage Vcc.

The inverting input terminal of the third operational amplifier 3430 is connected with the power supply whose voltage is Vcc, through the resistor R31. The non-inverting input terminal of the third operational amplifier 3430 is connected with the output terminal of the second operational amplifier 3420 in the first inverting amplifier 342. The half-wave rectification wave signal is output from the output terminal of the third operational amplifier 3430. The output terminal of the third operational amplifier 3430 is connected with the inverting terminal of the third operational amplifier 3430 through the resistor R32.

The construction of the photographing apparatus 1 in the second embodiment, is the same as the construction of the photographing apparatus 1 in the first embodiment, except that the signal (the half-wave rectification wave signal) which is converted by the second wave converter circuit 34b and supplied to the LED 31, is different from the signal (the first sine wave signal) which is converted by the first wave converter circuit 34a and supplied to the LED 31.

The half-wave rectification wave signal is the rectangular wave signal which has the high-frequency component removed and for which only the primary component remains. Accordingly, when the LED 31 is illuminated on the basis of the half-wave rectification wave signal, it is possible to reduce the influence of noise in the power line, and noise to be transmitted to the peripheral circuit, that is caused by the high-frequency component which is included in the rectangular wave signal, in comparison with when the LED 31 is illuminated on the basis of the rectangular wave signal.

Because the increase/decrease of the radiation level is continuously repeated due to the half-wave rectification wave signal, in the exposure time, the temperature rise of the LED 31 is restrained, similar to the case where the LED 31 is driven by the rectangular wave signal. Further, because the amplitude Vcc of the half-wave rectification wave signal is non variable, there are also the merits of stabilizing the radiation quantity of the LED 31, to supply the predetermined light quantity, and of simplifying the circuit, in comparison with when the amplitude modulated sine wave signal is supplied to the LED 31 in the exposure time.

Further, in the second embodiment, it is possible to have a sharp inclination at the start of the wave signal (the half-wave rectification wave signal) which is supplied to the LED 31, in comparison with the inclination at the start of the wave signal (the first sine wave signal) which is supplied to the LED 31 in the first embodiment. So, it becomes easy to obtain the specified light quantity instantaneously. Further, the influence of the rush current can be reduced.

Figure 14:
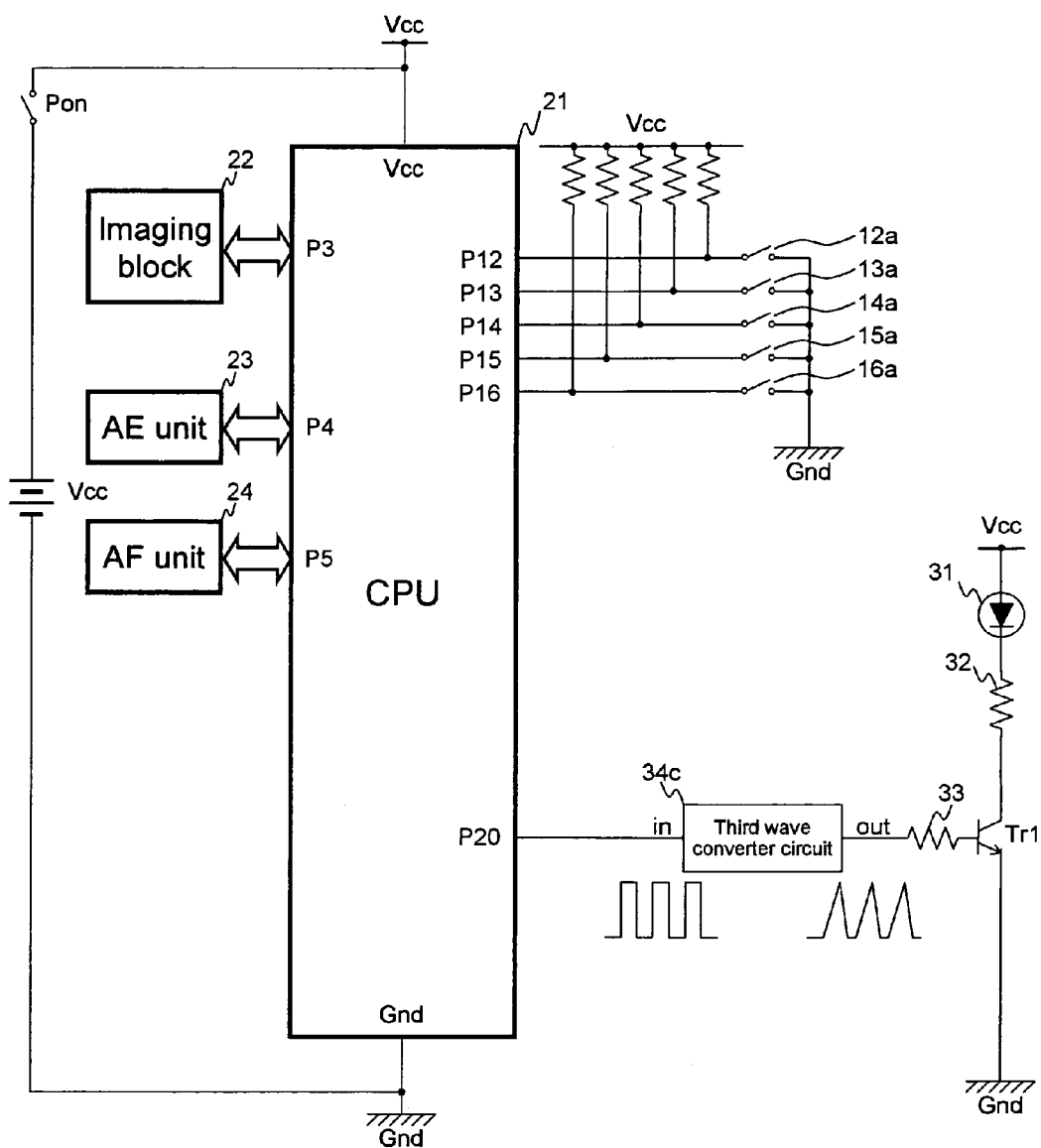
FIG. 14 is a circuit construction diagram of the photographing apparatus of the third embodiment.
Figure 15:
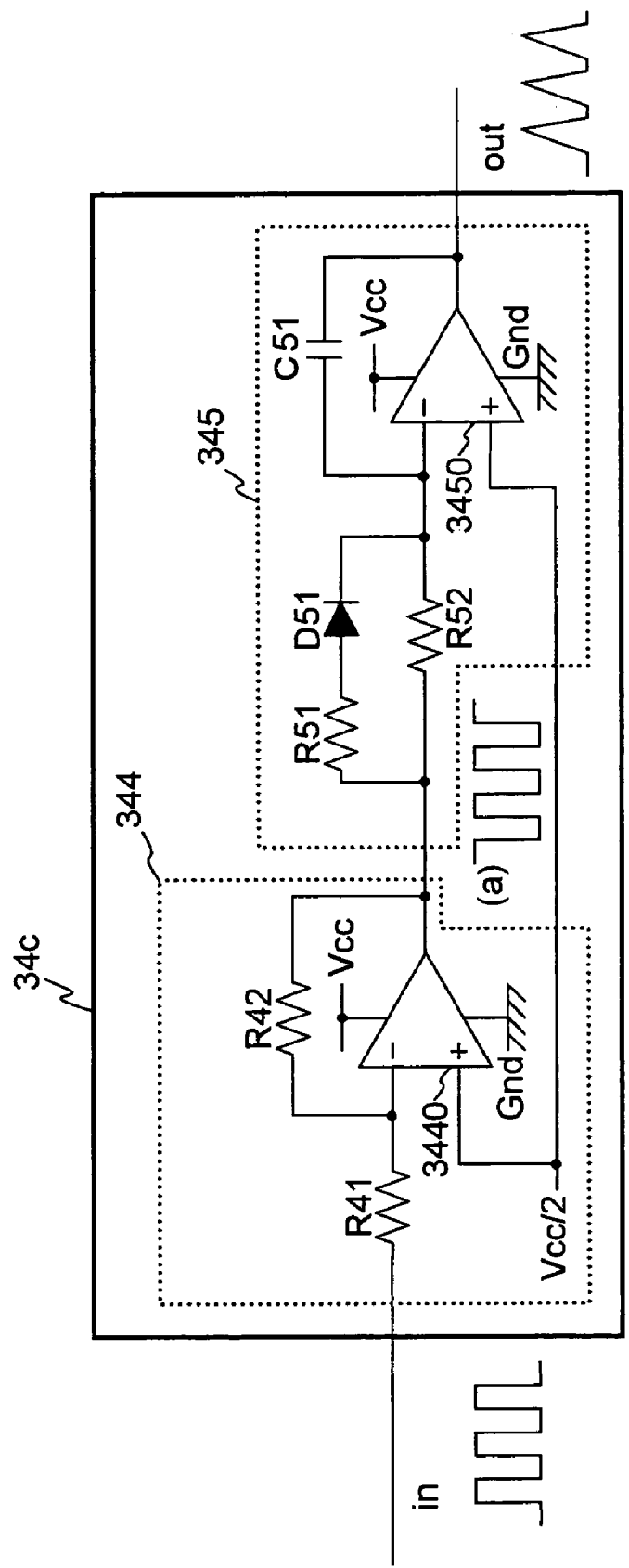
FIG. 15 is a circuit construction diagram of the third wave converter circuit of the third embodiment.

Next, the third embodiment is explained with reference to FIG. 1 to FIG. 4 and FIG. 14 to FIG. 16. In the third embodiment, the saw wave signal or the triangle wave signal which is converted from the rectangular wave signal, is supplied to the LED 31 through the current limiting resistor 33 etc. FIG. 14 is a circuit construction diagram of the photographing apparatus 1, in which the third wave converter circuit 34c has replaced the first wave converter circuit 34a.

Figure 16:
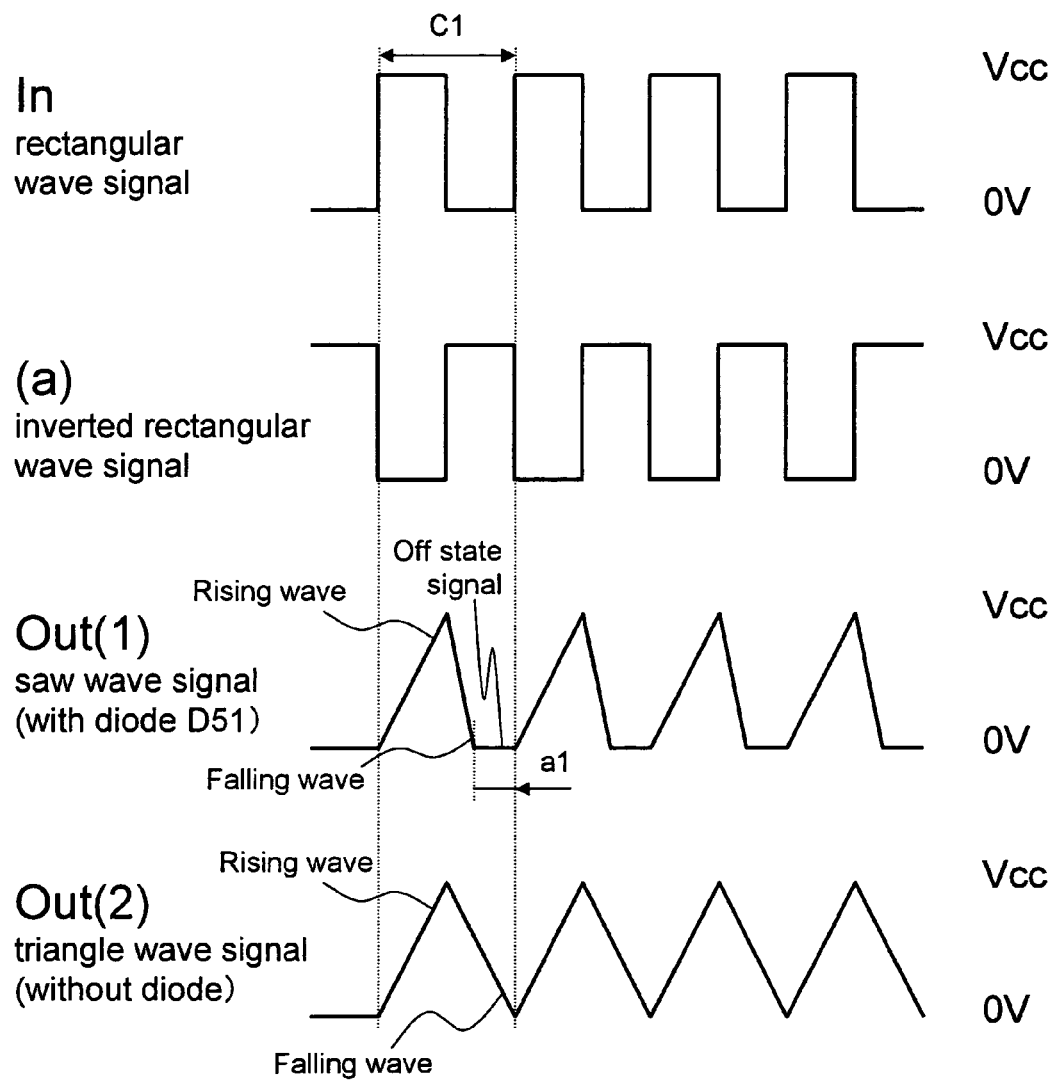
FIG. 16 shows the rectangular wave signal, the inverted rectangular wave signal, the saw wave signal, and the triangle wave signal.

The saw wave signal is composed of a rising wave, a falling wave, and an off-state signal whose length is a1, which are connected (see the "out (1)" wave form of FIG. 16). There is an off-state period a1 after the falling wave and before the next rising wave, in the saw wave signal. The amplitude of the saw wave signal is Vcc, and the cycle of the saw wave signal is C1.

The triangle wave signal is composed of a rising wave, and a falling wave which are connected (see the "out (2)" wave form of FIG. 16). There is no off-state period after the falling wave and before the next rising wave, in the triangle wave signal. The amplitude of the triangle wave signal is Vcc, and the cycle of the triangle wave signal is C1.

The radiation level of the LED 31 is synchronized with the saw wave signal, during illumination. Specifically, the radiation level of the LED 31 has a saw wave form which has the same cycle as the cycle C1 of the saw wave signal, so that when the radiation level of the LED 31 has a maximum value, the saw wave signal has a maximum value. However, the radiation level of the LED 31 is based on a characteristic of the LED 31 and a current amplification factor of the transistor Tr1.

The radiation level of the LED 31 is synchronized with the triangle wave signal, during illumination. Specifically, the radiation level of the LED 31 has a triangle wave form which has the same cycle as the cycle C1 of the triangle wave signal, so that when the radiation level of the LED 31 has a maximum value, the triangle wave signal has a maximum value. However, the radiation level of the LED 31 is based on a characteristic of the LED 31 and a current amplification factor of the transistor Tr1.

The photographing apparatus 1 comprises a third wave converter circuit 34c instead of the first wave converter circuit 34a, in the third embodiment. The third wave converter circuit 34c has a second inverting amplifier 344 and an integrating circuit 345.

The second inverting amplifier 344 converts the rectangular wave signal, which has the pulse-amplitude Vcc and the pulse-cycle C1 (see the "in" wave form of FIG. 16), to an inverted rectangular wave signal, which has the pulse-amplitude Vcc and the pulse-cycle C1, and which has the opposite phase to that of the rectangular wave signal (see the "(a)" wave form of FIG. 16). While the rectangular wave signal is in the on state, the inverted rectangular wave signal is in the off state. While the rectangular wave signal is in the off state, the inverted rectangular wave signal is in the on state.

The integrating circuit 345 converts the inverted rectangular wave signal to the saw wave signal (see the "out (1)" wave form of FIG. 16) or to the triangle wave signal (see the "out (2)" wave form of FIG. 16). When the falling wave section of the rectangular wave signal starts, the saw and triangle wave signals have the maximum value. When the rising wave section of the rectangular wave signal starts, the triangle wave signal has the minimum value. While the rectangular wave signal is in the off state, the saw wave signal is falling or has the minimum value (off state).

Accordingly, the CPU 21, the third wave converter circuit 34c, the current limiting resistor 33, the transistor Tr1, and the limiting resistor 32 have a signal supplying function which supplies the saw wave signal or the triangle wave signal to the LED 31.

The second inverting amplifier 344 has a resistor R41, a resistor R42, and a fourth operational amplifier 3440. The fourth operational amplifier 3440 has an inverting input terminal, a non-inverting input terminal, and an output terminal. The fourth operational amplifier 3440 is supplied with power having a voltage Vcc.

The inverting input terminal of the fourth operational amplifier 3440 has the rectangular wave signal input thereto. The rectangular wave signal is the input signal passing through the resistor R41, from the port 20 of the CPU 21. The non-inverting input terminal of the fourth operational amplifier 3440 is connected with the power supply whose voltage is ½ Vcc, and is connected with the non-inverting input terminal of the fifth operational amplifier 3450 in the integrating circuit 345 which is described later. The inverted rectangular wave signal is output from the output terminal of the fourth operational amplifier 3440. The output terminal of the fourth operational amplifier 3440 is connected with the inverting terminal of the fourth operational amplifier 3440 through the resistor R42, and is connected with the inverting input terminal of the fifth operational amplifier 3450, through the resistor R52 or the resistor R51 and the diode D51 in the integrating circuit 345 which is described later.

The integrating circuit 345 has a resistor R51, a resistor R52, a capacitor C51, a diode D51, and a fifth operational amplifier 3450, for outputting the saw wave. When the integrating circuit 345 outputs the triangle wave, the integrating circuit 345 does not have the diode. The construction of the integrating circuit 345 to output the saw wave is the same as the construction of the integrating circuit 345 to output the triangle wave, except for the presence of the diode D51.

The fifth operational amplifier 3450 has an inverting input terminal, a non-inverting input terminal, and an output terminal. The fifth operational amplifier 3450 is supplied with power having voltage Vcc.

The inverting input terminal of the fifth operational amplifier 3450 has the inverted rectangular wave signal input thereto. The inverted rectangular wave signal is input, through the resistor R52, from the output terminal of the fourth operational amplifier 3440. The cathode of the diode 51 is connected with the inverting input terminal of the fifth operational amplifier 3450 and one terminal of the resistor R52. The anode of the diode 51 is connected with one terminal of the resistor R51. The other terminal of the resistor R51 is connected with the output terminal of the fourth operational amplifier 3440 in the second inverting amplifier 344, and the other terminal of the resistor R52. So that the resistor R51 and the diode D51 is connected between the output terminal of the fourth operational amplifier 3440 and the inverting input terminal of the fifth operational amplifier 3450, parallel to the resistor R52.

The non-inverting input terminal of the fifth operational amplifier 3450 is connected with the non-inverting input terminal of the fourth operational amplifier 3440 and the power supply whose voltage is ½ Vcc.

The output terminal of the fifth operational amplifier 3450 is connected with the inverting input terminal of the fifth operational amplifier 3450 through the capacitor C51. The saw wave signal or the triangle wave signal is output from the output terminal of the fifth operational amplifier 3450.

The construction of the photographing apparatus 1 in the third embodiment, is the same as the construction of the photographing apparatus 1 in the first embodiment, except that the signal (the saw wave signal or the triangle wave signal), which is converted by the third wave converter circuit 34c and is supplied to the LED 31, is different from the signal (the first sine wave signal) which is converted by the first wave converter circuit 34a and is supplied to the LED 31.

In the third embodiment, the saw wave signal and the triangle wave signal are rectangular wave signals which have the high-frequency component removed. Accordingly, when the LED 31 is illuminated on the basis of the saw wave signal or the triangle wave signal, it is possible to reduce the influence of noise in the power line, noise to be transmitted to the peripheral circuit, that is caused by the high-frequency component which is included in the rectangular wave signal, and rush current, in comparison with when the LED 31 is illuminated on the basis of the rectangular wave signal.

Because the increase/decrease of the radiation level is continuously repeated due to the saw wave signal or the triangle wave signal, in the exposure time, the temperature rise of the LED 31 is restrained, similar to the case where the LED 31 is driven by the rectangular wave signal. Further, because the amplitude Vcc of the saw wave signal or the triangle wave signal is non variable, there are also the merits of stabilizing the radiation quantity of the LED 31, to supply the predetermined light quantity, and of simplifying the circuit, in comparison with when the amplitude modulated sine wave signal is supplied to the LED 31 in the exposure time.

In these embodiments, it was explained that the CPU 21 and the first, second, or third wave converter circuit 34a, 34b, or 34c etc. supply the sine wave signal or the half-wave rectification wave signal or the saw wave signal or the triangle wave signal to the LED 31, however the CPU 21, which has the D/A converter, may supply the sine wave signal or the half-wave rectification wave signal or the saw wave signal or the triangle wave signal to the LED 31 directly.

The pulse-amplitude of the rectangular wave signal, the amplitude of the first sine wave signal, the amplitude of the second sine wave signal, the amplitude of the half-wave rectification wave signal, and the amplitude of the saw or triangle wave signal, do not have to be the same as each other, so that the pulse-cycle of the rectangular wave signal, the cycle of the first sine wave signal, the cycle of the second sine wave signal, the cycle of the half-wave rectification wave signal, and the cycle of the saw or triangle wave signal, do not have to be the same as each other. The same effect can be obtained by designing the circuit in order to output a first sine wave signal etc. which has a predetermined amplitude and a predetermined cycle.

In these embodiments, it was explained that the lighting device depends on radiation from an LED, however the lighting device may depend on other radiation devices which are driven by the sine wave signal etc. through the transistor circuit, and which illuminate a photographic subject.

In these embodiments, it was explained that the photographing apparatus 1 is a digital camera, however the photographing apparatus 1 may be a film camera.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Applications No. 2003-424490 (filed on Dec. 22, 2003) and No. 2003-424494 (filed on Dec. 22, 2003), which are expressly incorporated herein by reference, in their entirety.

The invention claimed is:

1. A lighting control apparatus of a photographing apparatus, comprising:
   a lighting device that illuminates a photographic subject by receiving one of a sine wave signal and a half-wave rectification wave signal, in the exposure time; and
   a signal supplying processor that supplies one of said sine wave signal and said half-wave rectification wave signal, to be received by said lighting device, to said lighting device in said exposure time,
   wherein said sine wave signal is composed of a first half sine wave and a second half sine wave, which are connected;

said half-wave rectification wave signal is composed of a third half sine wave and an off-state signal, which are connected;

said first half sine wave is a wave form corresponding to the on state of a rectangular wave signal and has the high-frequency component removed, so that only the primary component remains;

said second half sine wave is a wave form corresponding to the off state of said rectangular wave signal and has the high-frequency component removed, so that only the primary component remains; and said third half sine wave is a wave whose amplitude is two times that of said first half sine wave.

2. The lighting control apparatus according to claim 1, wherein the radiation level of said lighting device is synchronized with one of said sine wave signal and said half-wave rectification wave signal, to be received by said lighting device, during illumination.

3. The lighting control apparatus according to claim 1, wherein said lighting device is an LED.

4. The lighting control apparatus according to claim 1, wherein said lighting device is used as an electric flash.

5. The lighting control apparatus according to claim 1, wherein said signal supplying processor has said rectangular wave signal outputting processor, a wave converting processor, and an illuminating processor;

said rectangular wave signal outputting processor outputs said rectangular wave signal having a predetermined pulse-amplitude, a predetermined pulse-width, and a predetermined pulse-cycle;

said wave converting processor converts said rectangular wave signal to one of said sine wave signal and said half-wave rectification wave signal, to be received by said lighting device;

said illuminating processor supplies said converted rectangular wave signal, converted to one of said sine wave signal and said half-wave rectification wave signal, to said lighting device;

said converted rectangular wave signal, converted to one of said sine wave signal and said half-wave rectification wave signal, has an amplitude which is equal to said predetermined pulse-amplitude, and a cycle which is equal to said predetermined pulse-cycle;

a length of said on state of one cycle of said rectangular wave signal is equal to said pulse-width; and a length of said off state of one cycle of said rectangular wave signal is equal to the difference of said pulse-cycle and said pulse-width.

6. The lighting control apparatus according to claim 5, wherein said wave converting processor has an active filter circuit which converts said rectangular wave signal to said sine wave signal, and during the period said rectangular wave signal is in the on state, said sine wave signal reaches a minimum value, so that during the period said rectangular wave signal is in the off state, said sine wave signal reaches a maximum value.

7. The lighting control apparatus according to claim 5, wherein said wave converting processor has an active filter circuit and an inverting amplifier which converts said rectangular wave signal to said sine wave signal, and during the period said rectangular wave signal is in the on state, said sine wave signal reaches a maximum value, so that during the period said rectangular wave signal is in the off state, said sine wave signal reaches a minimum value.

8. The lighting control apparatus according to claim 7, wherein said active filter circuit has a first operational amplifier, and said inverting amplifier has a second operational amplifier;

an output terminal of said first operational amplifier is connected with an inverting input terminal of said second operational amplifier; and a non-inverting input terminal of said first operational amplifier is connected with a non-inverting input terminal of said second operational amplifier.

9. The lighting control apparatus according to claim 5, wherein said wave converting processor has an active filter circuit, an inverting amplifier, and a half-wave rectification circuit, which converts said rectangular wave signal to said half-wave rectification wave signal during the period said rectangular wave signal is in the on state, said half-wave rectification wave signal reaches the maximum value, so that while said rectangular wave signal is in the off state, said half-wave rectification wave signal is in the off state.

10. The lighting control apparatus according to claim 9, wherein said active filter circuit has a first operational amplifier, said inverting amplifier has a second operational amplifier, and said half-wave rectification circuit has a third operational amplifier;

an output terminal of said first operational amplifier is connected with an inverting input terminal of said second operational amplifier;

a non-inverting input terminal of said first operational amplifier is connected with a non-inverting input terminal of said second operational amplifier; and an output terminal of said second operational amplifier is connected with a non-inverting input terminal of said third operational amplifier.

11. The lighting control apparatus according to claim 5, wherein said pulse-cycle is set at a value where flickering does not occur in said lighting device.

12. The lighting control apparatus according to claim 5, wherein said pulse-cycle is set at a value which is equal to or less than 1/50 second.

13. The lighting control apparatus according to claim 5, wherein said illuminating processor has an amplifying unit, and supplies said converted rectangular wave signal, converted to one of said sine wave signal and said half-wave rectification wave signal, to said lighting device, through said amplifying unit; and said amplifying unit has a transistor.

14. A lighting control apparatus of a photographing apparatus, comprising:

a lighting device that illuminates a photographic subject by receiving one of a saw wave signal and a triangle wave signal in the exposure time; and a signal supplying processor that supplies one of said saw wave signal and said triangle wave signal, to be received by said lighting device, to said lighting device in said exposure time;

wherein said saw wave signal is composed of a rising wave, and a falling wave, and an off-state signal between said falling wave and said rising wave which are connected; and said triangle wave signal is composed of a rising wave and a falling wave which are connected, wherein said signal supplying processor has a rectangular wave signal outputting processor, a wave converting processor, and an illuminating processor;

said rectangular wave signal outputting processor outputs said rectangular wave signal having a predetermined pulse-amplitude, a predetermined pulse-width, and a predetermined pulse-cycle;

said wave converting processor converts said rectangular wave signal to one of said saw wave signal and said triangle wave signal, to be received by said lighting device;

said illuminating processor supplies the converted rectangular wave signal, converted to one of said saw wave signal and said triangle wave signal, to said lighting device;

said converted rectangular wave signal, converted to one of said saw wave signal and said triangle wave signal, has an amplitude which is equal to said predetermined pulse-amplitude, and a cycle which is equal to said predetermined pulse-cycle;

a length of said on state of one cycle of said rectangular wave signal is equal to said pulse-width; and a length of said off state of one cycle of said rectangular wave signal is equal to the difference of said pulse-cycle and said pulse-width.

15. The lighting control apparatus according to claim 14, wherein said saw wave signal and said triangle wave signal have the maximum value, when a falling wave section of said rectangular wave signal starts;

said triangle wave signal has the minimum value, when a rising wave section of said rectangular wave signal starts; and said saw wave signal is falling or has the minimum value, while said rectangular wave signal is in the off state.

16. The lighting control apparatus according to claim 14, wherein an amplitude of said converted rectangular wave signal, converted to one of said saw wave signal and said triangle wave signal, is the same as said pulse-amplitude of said rectangular wave signal; and a cycle of said converted rectangular wave signal, converted to one of said saw wave signal and said triangle wave signal, is the same as said pulse-cycle of said rectangular wave signal.

17. The lighting control apparatus according to claim 14, wherein said wave converting processor has an inverting amplifier, and an integrating circuit;

said inverting amplifier converts said rectangular wave signal to an inverted rectangular wave signal that has an opposite phase to that of said rectangular wave signal; and said integrating circuit converts said inverted rectangular wave signal to one of said saw wave signal and said triangle wave signal, to be received by said lighting device.

18. The lighting control apparatus according to claim 17, wherein said inverting amplifier has a fourth operational amplifier, and said integrating circuit has a fifth operational amplifier;

an output terminal of said fourth operational amplifier is connected with an inverting input terminal of said fifth operational amplifier; and a non-inverting input terminal of said fourth operational amplifier is connected with a non-inverting input terminal of said fifth operational amplifier.

19. The lighting control apparatus according to claim 14, wherein said pulse-cycle is set at a value where flickering does not occur in said lighting device.

20. The lighting control apparatus according to claim 14, wherein said pulse-cycle is set at a value which is equal to or less than 1/50 second.

21. The lighting control apparatus according to claim 14, wherein said illuminating processor has an amplifying unit, and supplies said converted rectangular wave signal, converted to one of said saw wave signal and said triangle wave signal, to said lighting device, through said amplifying unit; and said amplifying unit has a transistor.

* * * * *

UNITED STATES PATENT AND TRADEMARK OFFICE
CERTIFICATE OF CORRECTION

| | | |
|---|---|---|
| PATENT NO. | : 7,643,084 B2 | Page 1 of 1 |
| APPLICATION NO. | : 11/016906 | |
| DATED | : January 5, 2010 | |
| INVENTOR(S) | : Yuko Uenaka | |

It is certified that error appears in the above-identified patent and that said Letters Patent is hereby corrected as shown below:

On the Title Page, at item (30), Foreign Application Priority Data, should read --Dec. 22, 2003 JP P2003 - 424494--.

Signed and Sealed this

Thirtieth Day of March, 2010

David J. Kappos
*Director of the United States Patent and Trademark Office*